(12) United States Patent
Ciaramitaro et al.

(10) Patent No.: US 7,698,298 B2
(45) Date of Patent: Apr. 13, 2010

(54) SYSTEM AND METHOD FOR ELECTRONICALLY MANAGING REMOTE REVIEW OF DOCUMENTS

(75) Inventors: Barbara L. Ciaramitaro, Grosse Pointe Woods, MI (US); Michael A. Gruskin, West Bloomfield, MI (US); Edward C. Wolfe, Bloomfield Hills, MI (US)

(73) Assignee: Xerox Corporation, Norwalk, CT (US)

( * ) Notice: Subject to any disclaimer, the term of this patent is extended or adjusted under 35 U.S.C. 154(b) by 584 days.

(21) Appl. No.: 10/884,010

(22) Filed: Jul. 2, 2004

(65) Prior Publication Data

US 2005/0004950 A1    Jan. 6, 2005

Related U.S. Application Data

(60) Provisional application No. 60/484,731, filed on Jul. 3, 2003, provisional application No. 60/485,540, filed on Jul. 8, 2003.

(51) Int. Cl.
*G06F 17/30* (2006.01)
(52) U.S. Cl. ........................... 707/104.1; 707/3
(58) Field of Classification Search .......... 705/1; 707/513, 104.1, 100, 3
See application file for complete search history.

(56) References Cited

U.S. PATENT DOCUMENTS

| 5,132,900 | A |   | 7/1992 | Gilchrist et al. |
| 5,713,019 | A |   | 1/1998 | Keaten .................. 395/610 |
| 5,838,966 | A | * | 11/1998 | Harlan .................. 715/866 |
| 5,940,800 | A | * | 8/1999 | Bennett et al. ............ 705/1 |
| 6,016,491 | A | * | 1/2000 | Kou .................... 707/9 |
| 6,115,709 | A |   | 9/2000 | Gilmour et al. ............ 707/9 |
| 6,738,760 | B1 | * | 5/2004 | Krachman ............... 707/3 |
| 7,058,661 | B2 |   | 6/2006 | Ciaramitaro et al. |
| 7,065,515 | B2 |   | 6/2006 | Ciaramitaro et al. |
| 7,130,858 | B2 |   | 10/2006 | Ciaramitaro et al. |
| 2001/0056507 | A1 |   | 12/2001 | Bartkowiak et al. ......... 709/318 |
| 2002/0194223 | A1 | * | 12/2002 | Meyers et al. ............. 707/513 |

(Continued)

FOREIGN PATENT DOCUMENTS

EP    0457707 A2    4/1991

(Continued)

OTHER PUBLICATIONS

Dozier et al., "Creation of an expert witness database through text mining", Proceedings of the 9th international conference on Artificial intelligence, Jun. 2003, P-177-184. Retrieved from the Internet:<URL: http://portal.acm.org/ft_gateway.cfm?id=1047830 &type=pdf&coll=ACM&dl=ACM&CFID=59123183 &CFTOKEN=10125682>.*

(Continued)

*Primary Examiner*—Jean B. Fleurantin
*Assistant Examiner*—Dennis Myint
(74) *Attorney, Agent, or Firm*—Cantor Colburn LLP (57) ABSTRACT

A system and method are provided for electronically managing remote review of documents that are stored on a central repository. The remote review system advantageously enables a remote reviewer, lacking repository access, to remotely review and record decisions in respect to documents stored in the repository and then electronically integrate those remotely made decisions back into the repository. In this way, the inventive system and method promotes efficiency and consistency in responding to document requests for legal purposes.

23 Claims, 5 Drawing Sheets

U.S. PATENT DOCUMENTS

| | | | |
|---|---|---|---|
| 2003/0018576 A1* | 1/2003 | Zuckerbrot et al. | 705/38 |
| 2003/0028495 A1* | 2/2003 | Pallante | 705/78 |
| 2008/0127304 A1* | 5/2008 | Ginter et al. | 726/2 |

FOREIGN PATENT DOCUMENTS

| | | |
|---|---|---|
| EP | 1184798 A2 | 6/1998 |

OTHER PUBLICATIONS

Kimbrought et al., " On original generation of structure in legal document", International Conference on Artificial Intelligence and Law archive, Jun. 2003, P-152-161. Retrieved from the Internet::URL: http://portal.acm.org/ft_gateway.cfm?id=1047826&type=pdf&coll=ACM&dl=ACM&CFID=ACM&CFID=59123183&CFTOKEN=10125682>.*

PCT Search Report dated Jun. 13, 2006 for PCT/US04/21434 corresponding to this application.

Anonymous,"Copying and Entire Staple Package," Research Disclosure, Nov. 1, 1989, 2 p., vol. 307, No. 51, Mason Publications, Hampshire, GB.

Anonymous, "Distribute a Document and The documents Stapled to it in Context," Research Disclosure, Nov. 1, 1989, 2 p., vol. 307, No. 8, Mason Publications, Hampshire, GB.

Anonymous, "View a List of Documents which are Stapled to a Particular Document," Research Disclosure, Nov. 1, 1989, 2 p., vol. 307, No. 17, Mason Publications, Hampshire, GB.

C. Lee Giles et al., "CiteSteer: An Automatic Citation Indexing System," Digital Libraries 98—Third ACM Conferences on Digital Libraries, 1998, pp. 89-98, ACM Press, New York, United States.

European Patent Office Communication; European Application No. 04756644.3; Date of Mailing: Mar. 31, 2009; 4 pages.

Supplementary European Search Report; European Application No. 04777506.9; Date of Mailing: Sep. 23, 2008; 3 pages.

Supplementary European Search Report; European Application No. 04777532.5; Date of Mailing: Jun. 15, 2009; 5 pages.

F. MacDonald et al., "A Review of Tool Support for Software Inspection," 1995, pp. 340-349. 1066-1387/95, IEEE.

D. Georgakopoulos et al., "An Overview of Workflow Management: From Process Modeling to Workflow Automation Infrastructure, " Distributed and Parallel Databases, 1995, pp. 119-153, vol. 3, No. 2, Kluwer Academic Publishers, Boston, MA, USA.

C. Oussalah et al., "How to Rescue Former Queries to Facilitate the Formulation of New Ones," 2000, pp. 92-100, IEEE.

R. Baeza-Yates et al., "Modern Information Retrieval," Chapter 10, 1999, pp. 257-340, ISBN: 978-0-201-39829-8, ACM Press, New York, United States.

R. Baeza-Yates et al., "Modern Information Retrieval," Chapter 2, 1999, pp. 20-71, ISBN: 978-0-201-39829-8, ACM Press, New York, United States.

European Search Report, 04777506.9-2201/1642195, PCT/US2004021434, Sep. 23, 2008.

Georgakopoulos D et al: "An Overview of Workflow Management: From Process Modeling to Workflow Automation Infrastructure", Distributed and Parallel Databases, Kluwer, NL, vol. 3, No. 2, Apr. 1, 1995, pp. 119-153, XP001055255, ISSN: 09-8782, *p. 125, line 18-p. 126, line 16*.

MacDonald F et al: "A Review of Tool Support For Software Inspection", Proceedings of the Seventh International Workshop on Computer-Aided Software Engineering. Toronto, Jul. 10-14, 1995; [Proceedings of the International Workshop on Computer-Aided Software Engineering], New York, IEEE, US, vol. Workshop 7, Jul. 10, 1995, pp. 340-349, XP000687710, ISBN: 978-0-7803-2946-1, *the whole document*.

* cited by examiner

SYSTEM AND METHOD FOR ELECTRONICALLY MANAGING REMOTE REVIEW OF DOCUMENTS

CROSS REFERENCE TO RELATED APPLICATIONS

This application claims priority to U.S. Provisional Application Ser. No. 60/484,731 filed Jul. 3, 2003, and to U.S. Provisional Application Ser. No. 60/485,540 filed Jul. 8, 2003 which are incorporated by reference herein in their entirety.

BACKGROUND OF THE INVENTION

The present invention relates generally to a system and method for electronically managing remote review of documents for legal purposes. More specifically, the invention relates to an improved system and method for permitting stand-alone remote review of the documents while providing integration with a repository where the documents are electronically stored.

Legal matters often involve massive volumes of information that must be organized and categorized in response to particular inquiries or issues, such as litigation pleadings, business transactions, government regulations, etc. The information is typically managed by a centralized organization, such as a legal department or group therein having document coordinators. Managing this documentary information often requires the review and input of persons remote or external to the centralized organization, such as other attorneys, business persons, or experts. The remote reviewers are typically requested to provide their opinion or decision on the categorization and treatment of the information for a particular legal matter, for example, such as to produce or not produce in response to a discovery request. At times there may be numerous remote reviewers reviewing numerous sets or subsets of documents whose decisions must be recorded. Also, conflicting decisions must be identified and reconciled with each other. It must also be ensured that the decisions of the remote reviewers are correctly matched back to the exact same document or version of the document for which their input is being sought.

Existing methods for remote document review are time-consuming and not easily managed, tracked, recorded and reconciled. For example, the central document coordinator identifies a set of documents from the central repository needing external review. The external reviewers are typically located remote from the central document repository and are barred from accessing the repository in order to protect integrity of the documents stored in the repository. Thus, the coordinator prepares paper copies of the documents for review and sends them out to each of the remote reviewers for their stand-alone, external review. The coordinator manually ensures that the information sent for review is appropriately restricted, such as by removing privileged documents or portions thereof. The coordinator also has to somehow indicate the decisions that are requested for each of the documents, by manually creating a letter or other type of notice to the reviewer for the documents. The coordinator has no convenient way to track the status of the outstanding remote review requests.

Under existing review methods, the remote reviewers return the paper documents together with a particular decision—such as produce, do not produce, mark as privileged, defer to another reviewer, etc. . . . The returned documents are not necessarily in any particular order. As to each document, the coordinator must identify and resolve any conflicting decisions of different remote reviewers and any conflicts with prior decisions stored in the repository. This is typically done document by document—such as by manually sorting the documents or using a crude spreadsheet listing the documents and all of the current and prior decisions. The coordinator must also manually transfer any redactions and decisions onto the centralized document copy for the particular legal matter. Typically there is no historical record of decisions by the remote reviewer except in the paper file of that particular legal matter or as marked on the reviewer's document copy. Thus, the same or related reviewer may review the same documents for the same or a similar inquiry over and over again—sometimes even inadvertently being inconsistent with their prior decisions. Furthermore, other than the coordinator handling the specific legal matter, no other coordinator has ready access to decisions that have been made on a particular document by a remote reviewer except by finding and reviewing the paper documents for the other related legal matter. This can be especially problematic for documents that have been previously categorized as privileged.

In some instances, due to the time-consuming tracking effort involved, the final decision of the last remote reviewer may not necessarily be logged back into the central repository and recorded with the particular document and legal matter.

Thus, it is desirable to be able to easily identify, restrict, transmit, and track the documents sent to a remote reviewer, and to readily integrate the review decisions back into a centralized document repository. Further, it is desirable to easily match the decisions back to the correct document in the repository as well as to identify and reconcile any conflicting review decisions against prior decisions made as to the documents. It is also desirable to be able to easily identify any missing or otherwise deficient or incomplete decisions by the reviewers. Additionally, it is desirable to maintain the integrity of the documents stored in the centralized repository as well as easily record and store the historical review decisions in respect to the documents.

BRIEF DESCRIPTION OF THE INVENTION

According to one aspect of the invention, a system and method are provided for electronically managing the remote review of documents that are stored in a central repository. The inventive system and method advantageously enable a remote reviewer, lacking repository access, to remotely review and record decisions in respect to documents stored in the repository and then electronically integrating those remotely made decisions back into the repository.

In another aspect of the inventive system and method for electronically managing the remote review of documents stored in a central repository, an export tool is provided for exporting a copy of one or more documents for remote review by a reviewer lacking access to the repository, and an import tool is provided for importing decisions of the remote reviewer back into the central repository in association with the documents reviewed.

In a further aspect of the invention, a stand-alone decision tool enables a remote reviewer to electronically review documents from a central repository and record decisions about the documents for integration into the repository without having access to the repository. The electronic decision tool contains electronic copies of the documents for review thereby enabling the reviewer to electronically review the documents with the decision tool without having access to the documents in the repository. The electronic decision tool also contains a list of decisions requested of the reviewer for each of the documents and a selection tool for electronically recording the requested decisions thereby enabling the reviewer to electronically record the requested decisions into the decision tool for transmission back to the repository.

In yet another aspect of the invention, the system includes an import tool that identifies discrepancies between decisions requested of the reviewer and decisions made by the reviewer as well as conflicts with prior decisions stored in the repository thereby enabling resolution of the discrepancies and conflicts as well as insuring consistency in handling of the documents.

BRIEF DESCRIPTION OF THE DRAWINGS

Referring to the exemplary drawings wherein like elements are numbered alike in the several FIGURES.

DETAILED DESCRIPTION OF THE INVENTION

Figure 1:
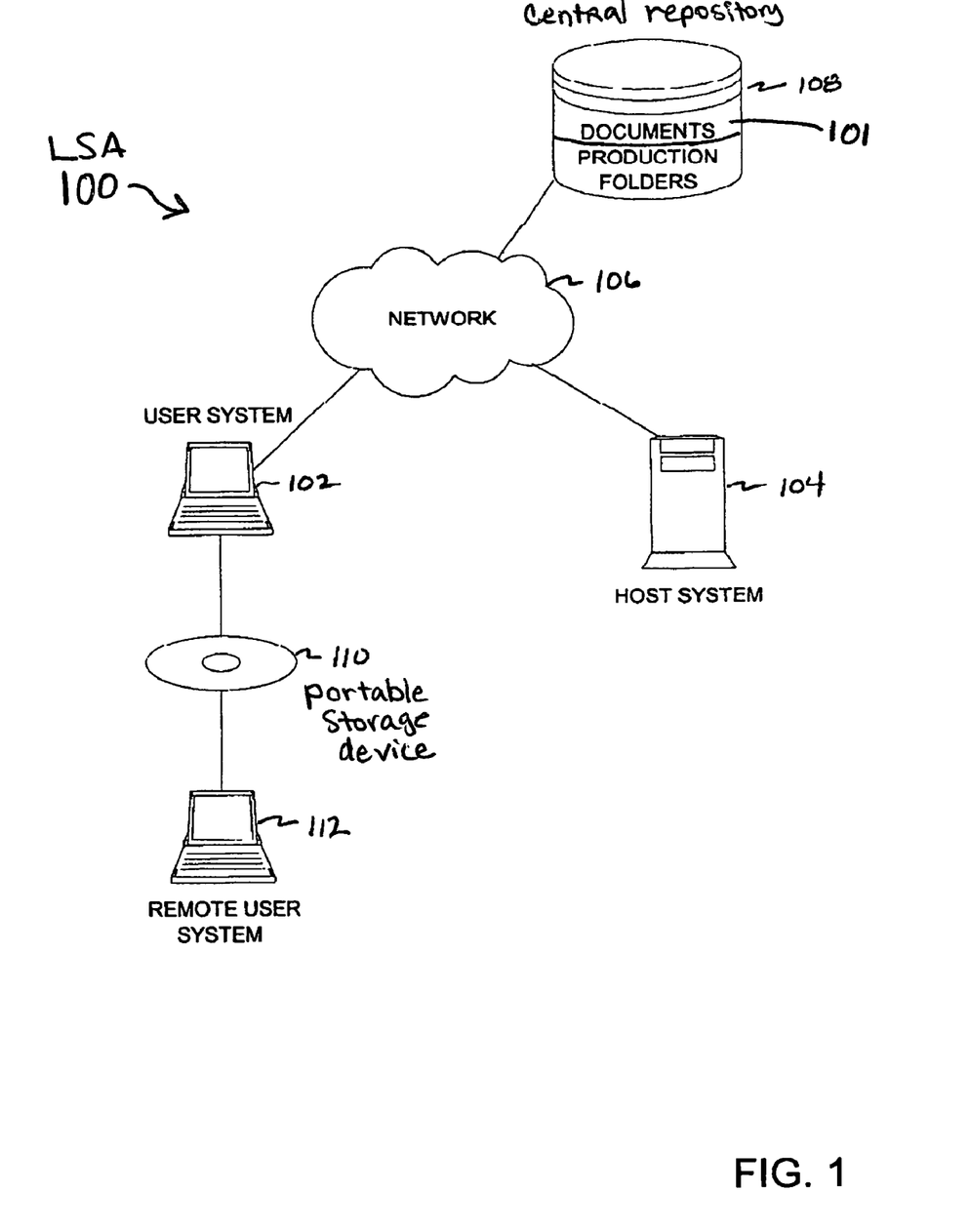
FIG. 1 is a block diagram of an exemplary system for document review.

In accordance with exemplary embodiments, a Legal Support Application (LSA) 100, shown generally in FIG. 1, is a system that includes information and computer processes, software and/or programs to perform activities in support of legal matters. Legal matters often involve massive volumes of documentary information that must be organized, searched, reviewed, and categorized in response to particular inquiries or issues, such as litigation pleadings, business transactions, government regulations, and other legal issues. The LSA 100 is used to electronically store and manage documents 101 as well as other information regarding legal matters. For example, the LSA 100 may include a wide variety of functions and tools, including calendaring, docketing, general case matter information and other case management functions for the legal matters. Information in the LSA 100 includes the documents 101 that are electronically stored in a central data repository 108.

As stated, the documents 101 are electronically stored in the central repository 108 and broadly include, without limitation, documents, drawings, test information, technical information, computer files, business records, and any other type of information that may be sought in a legal matter. The documents 101 may be electronically stored in the repository 108 in any suitable electronic form, such as digital files, image files, native files, and any combinations thereof. The documents 101 are preferably electronically stored in their entirety in the repository 108.

While less desirable, some documents 101 may be electronically stored in the central repository 108 in a partial form. For example, large engineering drawings may be electronically stored using identifying information or partial images in the repository 108. It will also be appreciated that documents 101 may be multi-page documents, a single page document, a computer file, or any larger groupings, smaller divisions or any portions thereof that are identified as a document 101 in the central repository 108.

It will further be appreciated that several related documents 101 may be grouped together as a composite document such that the composite document may be treated as a single grouped document or each as individual documents in the LSA 100 that can be separately or individually reviewed for document decisions. A detailed description of a commonly assigned invention related to electronic management of composite documents in LSA 100 is found in patent application PCT/US04/21461 entitled "System and Method for Electronically Managing Composite Documents", filed the same day as the present application, Jul. 2, 2004 and which is herein incorporated by reference in its entirety. The documents 101 each have associated document records 103 in the repository 108. The document records 103 contain information associated with their corresponding documents 101 such as any document decisions relating to the categorization, treatment, or other related properties of the documents 101, as described further hereinafter.

Referring to FIG. 1, the documents 101 are stored in a central repository 108 that may be managed by a central group of document coordinators, such as for a corporation or law firm. The document coordinators are users of the LSA system for electronically managing the documents 101, including the remote review thereof in accordance with the present invention. It will be appreciated that the LSA users may be given varying levels of access and authority within the LSA 100. While the repository 108 is referred to as a central repository 108, it will be appreciated that an organization could have several central repositories 108 that are accessible by the LSA users. The integrity of the documents 101 in the central repository 108 is maintained by only permitting LSA users to have access to the documents 101 in the repository 108. The repository 108 stores electronic copies of the documents 101 as well as preferably stores the document records 103 containing the decisions associated with each of the documents 101.

Documents record 103 electronically stored in the LSA are associated with a document 101 in the central repository 108 and may be associated with their respective documents 101 into two types of instances: the master instance, which is the master permanent or default copy of the document 101 and its associated master decisions and properties, and the production instance, which is the production copy of the document 101 and its associated production decisions and properties used for production in a particular legal matter. A production refers to a set of documents 101 that have been or will be delivered to an opposing counsel or other external party in response to a request or inquiry on a legal matter. Each document 101 has only one master instance and one set of master decisions; however, each time a document 101 is associated with a production folder in LSA, a new and unique production instance and set of production decisions is created for that document 101.

A document record 103 associated with a document 101 in LSA may contain both master decisions associated with the document 101 and production decisions associated with the document 101. The master and production decisions are decisions that have made by either an LSA user or a remote reviewer and uploaded and stored in LSA 100. The decisions are preferably stored on the document record 103 in the repository 108 with the documents 101; however, it will be appreciated that the decisions could be stored in a repository or database that is separate from the documents 101 as long as they can still be searched and associated with the documents 101 in accordance with aspects of this invention. Such master or production decisions that are stored in LSA 100 are generally referred to herein as prior decisions.

The decisions associated with the documents 101 may typically include document treatment, categorizations, types or properties that are made and entered by the LSA user directly or made with the assistance of a remote reviewer. These decisions include categorizations such as privileged, partially privileged, proposed for privileged, non-privileged, protected (such as proprietary or confidential to the document owner), not protected, treatments such as "produce" or "do not produce", document types, such as purchase order or non-disclosure agreement, or issue codes such as product relation, litigation type, matter type or other predetermined decisions defined in accordance with the rules of the LSA system.

It will be appreciated that the document records 103 preferably contain standardized fields associated with standard decisions related to the documents 101 for the master instance and the production instances. Such fields may be presented for selection on a user interface, such as to the LSA user or on a stand-alone decision tool 30 for a remote reviewer, as described further hereinafter. For example, the document record 103 can contain a field with a predetermined selection of privileged, partially privileged, proposed privilege or non-privileged. The document record 103 may contain another field for selection of produce, partially produce, or do not produce. Another field may have a predetermined selection of protected or not protected. Yet other fields may have predetermined selections of issue codes or document types. The standardization of these fields with predetermined selections enables the easy identification of requested remote review decisions, electronic recordation of the decisions in LSA 100, and import of the decisions into LSA 100. This enables the LSA user to electronically check for conflicts with prior decisions on the same documents 101 for a given production instance or master instance as well as to electronically identify missing or incomplete decisions by the remote reviewer.

In accordance with certain aspects of the invention, the privileged and partially privileged master decisions and documents 101 associated with those decisions may not be removed or changed by an LSA user for a document 101 in the production instance, and may only be changed in the master instance by an LSA system administrator having a higher level of authority, thus avoiding inadvertent production of a privileged document 101 and possible inadvertent waiver of privilege. Even more preferably, the repository 108 contains a privileged schema for storing documents 101 having an associated privileged or partially privileged decision and a non-privileged schema for storing documents having an associated non-privileged decision. While any decisions could potentially be specified as master decisions, at least the privilege-related decisions are designated as master decisions. A detailed description of the invention regarding the privileged and non-privileged schema is found in commonly assigned patent application PCT/US04/21497 entitled "System and Method for Electronically Managing Privileged and Non-Privileged Documents", filed the same day as the present application, Jul. 2, 2004 and which is herein incorporated by reference in its entirety. Thus, the documents 101 having privileged and partially privileged decisions and their document records 103 or portions thereof are removed from and stored in an entirely separate privileged database schema such that the inadvertent production of such documents and/or inadvertent waiver of privilege is avoided. The non-privileged schema may contain a limited document record 103 associated with a matching document 101 and document record 103 in the privileged schema, that simply acts a place holder or identifier for the production instance to show that relevant privileged documents 101 have been identified, but not produced. However, the privileged documents 101 are not otherwise accessible to the LSA user in the non-privileged schema.

The LSA user electronically identifies the appropriate documents 101 to comply with a request or inquiry related to a legal matter. The LSA user searches the LSA 100 for documents 101 that may be relevant or responsive to a particular inquiry, such as a discovery request or other legal pleading. In accordance with aspects of the present invention, the LSA user can identify the documents 101 that may be given consideration for a particular legal matter in LSA by foldering or holding such documents 101 in the LSA 100 and advantageously may electronically designate such held documents for remote review by a remote reviewer by name or skill set. The documents 101 for review by a remote reviewer are typically associated with a production instance, but could also be associated with a master instance. The documents 101 may be held and designated for review individually or in batches or groups. In accordance with other aspects of the invention, the documents 101 may be designated for a single or multiple joint reviews and easily exported to the remote reviewer for decisions associated with the documents that are electronically integrated back into the repository.

Also advantageously, the LSA 100 allows the user to adopt documents 101 and their prior decisions, such as decisions associated with a similar prior production instance, so that additional review of the same documents 101 is not required or such that the prior review decisions can be exported and displayed for the remote reviewer for acceptance or rejection of prior review decisions. This feature is enabled since the LSA 100 beneficially stores all documents 101 and all historical prior decisions associated with the documents 101, such as in the document records 103 in the repository 108, thereby enabling efficiency of document identification by the LSA user and expedited review of documents 101 relating to similar types of legal matters or production instances. A detailed description of this inventive feature is found in commonly assigned patent application PCT/US04/21484 entitled "System and Method for Electronically Managing Discovery Pleading Information", filed the same day as the present application Jul. 2, 2004 and which is herein incorporated by reference in its entirety.

It will be appreciated that the LSA user often does not have the luxury of having such similar inquiries or requests on the same documents 101 as to be able to adopt all of the prior decisions for a new, incoming request. Also, the LSA user often does not have all the knowledge or information necessary to make the final decision as to how to categorize or treat the documents 101 for the particular legal matter. In order to facilitate the necessary reviews, the LSA user electronically "holds" or designates in LSA 100 all or a portion of the documents 101 relating to a legal matter as requiring distribution to a remote reviewer for decisions on the documents 101. It is noted that LSA 100 preferably automatically blocks the ability of the LSA user to designate privileged documents for remote review, such as by allowing the user to only operate in the non-privileged schema, as described above.

Accordingly, it will be appreciated that legal matters often require the review of documents 101 by one or more external or remote reviewers, such as engineers, medical personnel, other technical experts, attorneys, business persons, and possibly many others. As used herein, the term remote reviewer refers to any reviewer of documents 101 that is not an LSA user having sufficient access to the LSA 100 and the documents 101 in the repository 108 to perform their requested review on LSA 100. For any given legal matter, it will be appreciated that the documents 101 may need to be reviewed by one or more remote reviewers either simultaneously or in sequence. In accordance with aspects of the invention, numerous remote reviewers can simultaneously or sequentially review and record decisions for electronic integration into the central repository 108 by the LSA user with conflicts and discrepancies being electronically identified and resolved, as will now be described.

Figure 2:
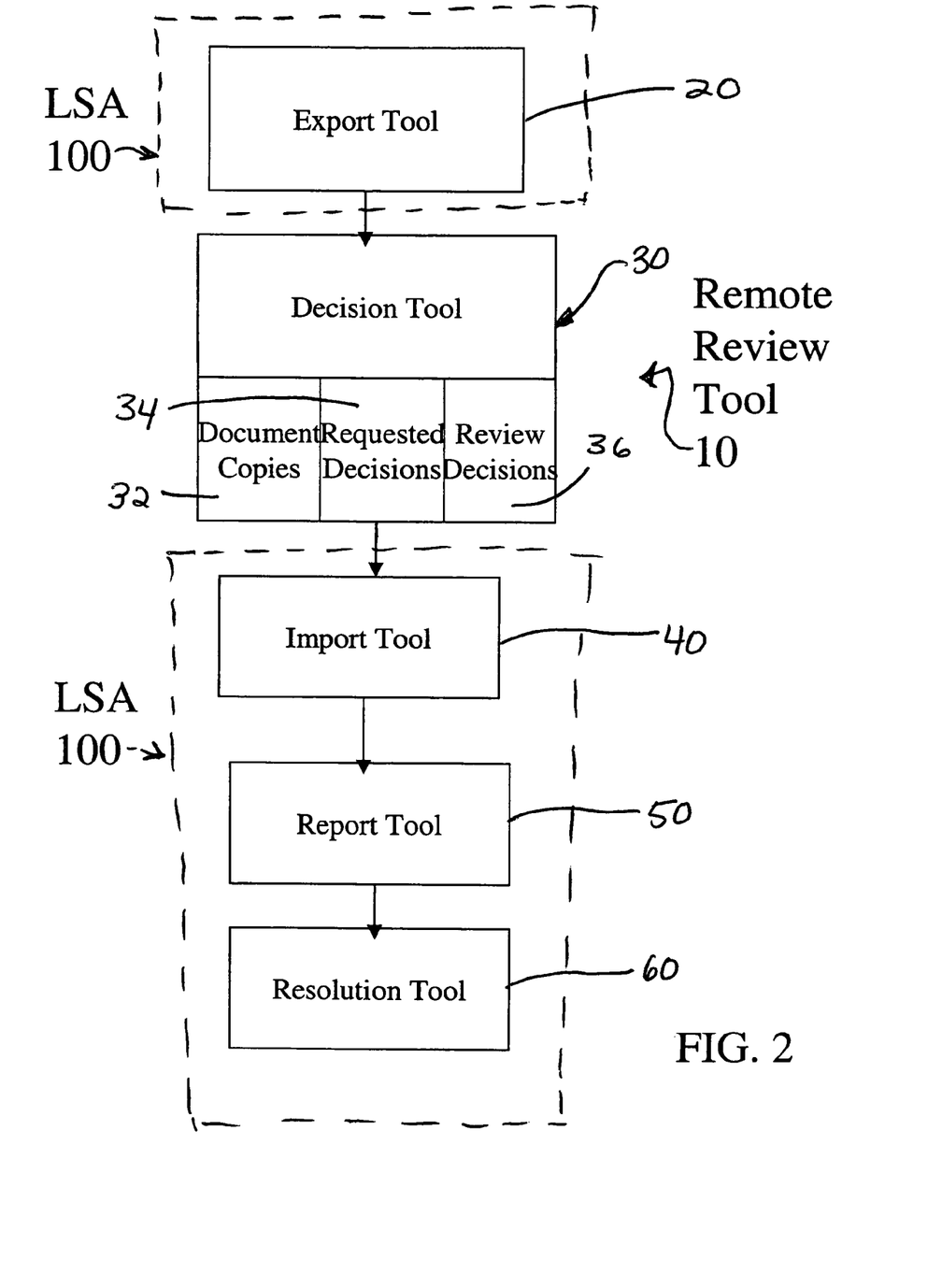
FIG. 2 is a flow diagram of an exemplary system and method that may be utilized by exemplary embodiments of the invention.

As shown generally in FIG. 2, the LSA 100 contains a remote review tool 10 being a suite of related modules or tools 20, 30, 40, 50, 60. The remote review tool 10 advantageously provides an electronic tool for electronically managing the remote review of documents 108 for legal purposes. The remote review tool 10 permits stand-alone electronic remote review of documents 101 from the repository 108 while providing electronic integration of the review decisions into the repository 108 without the remote reviewer having access to the repository 108. The remote review tool 10 permits the LSA user to readily export the designated, electronically stored documents 101 for review by one or more remote reviewers lacking access to the repository 108. The remote review tool 10 further permits electronic integration of the review decisions back into the repository 108 by the LSA user. It will also be appreciated that the remote review tool 10, through the decision tool 30, provides a simple, user-friendly, stand-alone tool so that remote reviewers can review documents and record decisions for electronic integration into the repository 108 without having training in or access to LSA 100.

In accordance with one aspect of the invention, the remote review tool 10 is preferably limited to the non-privileged schema by most LSA users so that inadvertent production of privileged documents and/or inadvertent waiver of privilege is avoided. However, it will be appreciated that a parallel remote review tool 10 could also be permitted in the privileged schema with limited access and use by a select group of LSA users in connection with a set of qualified remote reviewers, such as other attorneys working on the legal matter not having access to LSA or not being familiar with LSA.

Referring to FIG. 2, the remote review tool 10 includes an export tool 20 for exporting electronic copies of documents 101 and for creating and downloading other information and data for use by the remote reviewer to conduct the remote review on a separate, stand-alone system. Other information loaded into the decision tool 30 from the export tool 20 may include data and stand-alone software regarding the types of decisions requested of the reviewer, a pick-list selection of requested decisions, prior historical decisions on the documents 101 made by the reviewer or for similar legal matters, and a tool for recording and creating a review decision file 36 for transmission back to the LSA user to associate the decisions with the documents 101 held in the central repository 108.

In accordance with further aspects of the invention, the export tool 20 enables the LSA user to export documents that have been electronically marked or held as requiring distribution to a remote reviewer for decisions on the documents 101, such as by electronically foldering or otherwise marking the documents 101 for review by a particular reviewer or reviewer type. The identifications are preferably associated with a production instance of the documents 101 designated for review, but could also potentially be made in the master instance, especially for a new set of documents 101 being first input to the LSA 100. In addition, the export tool 20 also enables the LSA user to electronically export the decisions requested by the reviewer, such as by providing an electronic selection list based off computer instructions that associates requested review decisions with the documents 101 for review. Some possible selectable decisions associated with a document 101 and document record 103 were described above.

In addition, the export tool 20 preferably enables the LSA user to export information to the remote reviewer regarding prior decisions associated with the documents 101, especially those that were previously made by the remote reviewer or in production for a similar legal matter. Advantageously, this LSA system 100 and remote review tool 10 optionally enable information about historical prior decisions to remain with the documents 101 for expedited and consistent review and production of documents 101 by LSA users and remote reviewers. In accordance with other aspects of the invention, the export tool 20 includes computer programs and software that enables the LSA user to electronically copy or download a copy of the designated documents 101 from the central repository 108, as well as optionally prior decisions and requested decisions 34, including any instructions related to the decisions requested and/or a pick-list of the decisions requested for each of the documents 101. The information and data generated by the export tool 20 for transmission to the remote reviewer may be loaded onto a compact disk, floppy, USB or any other portable storage device 110, as shown in FIG. 1. While the portable storage device 110 is preferred such that the remote reviewer can upload into their own remote user system 112, as described in more detail below with respect to the decision tool 30, it will be appreciated that alternately, the export tool 20 could permit downloading into a computer file that may even be external or even internal to LSA 100, but external to the repository 108 and the documents 100 and document records 103, such that the remote reviewer could then upload the exported information and use the decision tool 30 from such a computer file in their own environment without having any knowledge of LSA 100. The list of requested decisions 34 in the decisions tool 30 may be in the form of a computer file or set of computer instructions and include an electronic selection or a limited pick list of decisions requested that are associated with each of the documents. For example, the LSA user may define selections such as "produce" or "not produce", but may not give the reviewer the opportunity to select or make decisions regarding privilege. It will be appreciated that many combinations are possible. Alternatively, there could also be free-form input fields enabling the remote reviewer to type in any comments or the remote reviewer could be allowed to flag certain documents 101 as not being amenable to the requested decision pick-list. Preferably, the export tool 20 allows the documents 101 to be copied for viewing only by the remote reviewer, although it will be appreciated that editable or markable documents 101 could also be transmitted.

Referring to FIG. 1, the decision tool 30 preferably resides on a portable storage device 110 when exported such that it is easily transmittable to a remote reviewer for uploading and use with a stand-alone computer or other remote user system 112. However as noted above, it could also reside on a computer file that is transmitted or e-mailed to the remote reviewer. The decision tool 30 includes the electronic copies 32 of the documents 101 exported from LSA using the export tool 20 for remote review. As noted above, while the documents 101 are preferably digital images of the entire documents 101, they may also be native files or partial information about the documents 101 being whatever is electronically stored as the document 101 in the repository 108.

The decision tool 30 also includes a set of requested decisions 34, comprising a set of computer instructions that are uploadable or readable on the computer hardware of the remote reviewer and containing instructions on making the decisions related to the documents 101. The requested decisions 34 may preferably include a limited electronic pick-list of decisions to be made for each document 101 for selection by the remote reviewer that correspond to matching fields in the document records 103 so that the decisions can easily be integrated back into LSA 100.

The decision tool 30 enables the remote reviewer to create a review decisions file 36 that contains the decisions made by the remote reviewer with regard to each of the documents 101 in electronic form. The review decisions file 36 is a computer file and/or instructions with the review decisions that were made with respect to each of the documents 101, a grouping of documents 101 or a portion of documents 101 in a manner associated with those documents 101 so that the decisions can be easily uploaded into LSA 100 using an import tool 40, as described below. Preferably, the review decisions file 36 contains fields that exactly match with corresponding fields in the document records 103 so that the decisions can be electronically integrated into the repository 108.

The review decisions file 36 is transmitted to the LSA user from the reviewer, and is preferably a stand-alone computer file that only contains the review decisions 36 and does not also include other parts of the decision tool 30, such as the copies of the documents 101, the decision tool software or the requested decisions file 34. The review decisions file 36 contains any type of decisions that were made with respect to the requested review documents, such as treatments, categorizations, properties and issues associated with the documents, which were described above in more detail. For example, the review decisions may include the recommended privileged status, protection status, issues codes, and production status. While the decision tool 30 may be set up to force the reviewer to make the all of the requested decisions related to all of the documents 101 prior to creating and sending the review decisions file 36 back to the LSA user, it is most typical that the reviewer will be permitted to make and save preliminary or partial decisions that can be transmitted back to the LSA user for integration.

Advantageously, it will be appreciated that the decision tool 30 received by the reviewer on the portable storage device 110 is preferably customized and self-contained for the requested review, including all of the decision making software, the electronic copies of the documents, the list of requested decisions and associated pick lists, and the computer files for recording, storing and transmitting the decisions back to the LSA user. It will further be appreciated that the portable storage device 110 is preferably erased or destroyed after completion of the tasks requested of the remote reviewer.

Generally for operation of the decision tool 30, the remote reviewer receives the decision tool 30 on a portable storage device 110 or in a computer file and uploads it into or reads it on a stand-alone computer remote or separate from the repository 108. The remote reviewer views the documents 101 electronically copied into the decision tool 30 and electronically reviews the requested decisions and enters the review decisions into the review decisions file 36. The remote reviewer may use the decision tool 30 in two modes—either in a view mode in which the electronic copies of the documents 101 can only be electronically reviewed without recording decisions or in a decision mode in which the remote reviewer can electronically make and save the review decisions, such as into the review decisions file 36.

While the electronic copies 32, requested decisions 34, and the review decisions 36 are described as three computer files, it will be appreciated that they could reside in a single computer file or that each could reside in multiple computer files within the decision tool 30. Advantageously, the decision tool 30 is a stand-alone tool that can be used remotely from LSA 100 and permit electronic review of documents 101 by a reviewer not having access to LSA 100 while still permitting electronic integration of the review decisions into LSA 100 using the import tool 40, described next below.

In accordance with yet other aspects of the invention, the import tool 40 enables an LSA user to electronically import the review decisions from a remote reviewer into the LSA and electronically associates the review decisions with their respective documents 101 in the repository 108.

The LSA user receives the review decisions file 36 from the remote reviewer, such as through any suitable portable electronic storage device 110 or by e-mail or other electronic transmission. Using the import tool 30, the review decisions file 36 is electronically uploaded into LSA 100 and electronically associates the reviewer decisions contained therein with their respective documents 101. The decisions are imported into the repository 108 for association with the documents 101 for use and designation on one particular legal matter—like to produce or not produce based on scope—and the decisions are also preferably simultaneously imported into the repository 108 for association with the master or other properties of the document 101— like a proposal to mark as privileged or to mark the document 101 as being associated with a certain legal matter type or issue code. Advantageously, the import tool 40 identifies any discrepancies between the requested decisions and the received decisions, such as missing or incomplete decisions. In addition, the import tool 40 advantageously identifies any conflicts between the review decisions being currently imported and all prior decisions made on the documents 101 and stored in the repository 108 which are either matter specific in the production instance and/or which are related to any established master decisions on the documents 101.

The LSA user may use the import tool 40 in different modes that may be dependent on their level of authority within LSA 100. For example, when importing decisions, the reviewer decisions that conflict with prior decisions in the repository 108 and would change the existing properties of the document 101 are preferably not automatically made to the repository 108 during the import procedure. The LSA user may upload the results decision file 36 in a passive mode such that the discrepancies and conflicts are saved into LSA 100 for reporting and resolution thereon at a later time by the same or a different LSA user. Alternately, LSA user may upload the results decision file 36 in an active mode wherein the discrepancies and conflicts are immediately identified and presented to the LSA use, such as by an interface screen, for either forced or optional resolution. For identification and resolution of discrepancies and conflicts, the remote review tool 10 further includes a report tool 50 and a resolution tool 60 that performs those functions within LSA 100, as will now be described.

The report tool 50 and the resolution tool 60 are considered part of the import tool 40 for purposes of this description, even though they may be integral with or separate from the portion of the import tool 40 that imports the remote review decisions to the repository 108 and may be used simultaneously therewith or independent therefrom. For example, the review decisions file 36 may contain a decision that a document 101 not be protected for a particular legal matter when the document 101 has a master status of protected. When importing the decision, the LSA user would need to decide whether this is an acceptable altered decision for that document and could 1) accept the decision into the central repository 108 to be associated with that document 101 as to be produced for the particular matter or 2) reject the decision (with or without requiring a reason to be inserted into the central repository 108 as to a reason for the rejection) or 3) could hold off and/or store the decision to be considered by either another LSA user or another remote reviewer before final acceptance and integration into the document record 103.

It will further be appreciated that final authoritative decisions on the documents 101 may be made by a non-LSA user, such as an outside counsel or an in-house counsel that is not an LSA user. Advantageously, these final decisions can be recorded remotely using the decision tool 30 and electronically imported and accepted by the LSA user into the system so that final, historical and complete decisions are stored in LSA 100.

In accordance with yet other aspects of the invention, the import tool 40 includes the report tool 50 that enables the LSA user to identify discrepancies between the requested review decisions and the resultant review decisions received, such as missing or incomplete decisions. In addition, the report tool 50 enables the LSA user to identify conflicts between the review decisions being currently imported for the documents 101 and any prior decisions in the repository 108. Using the report tool 50, the responsible LSA user can request an electronic identification of all imported decisions having discrepancies or conflicts for particular designated matters, folders, or more generally associated with documents 101 having a certain set of properties. The report tool 50 can provide reports to the LSA user identifying the discrepancies and conflicts related to requested documents 101. The report tool 50 can provide electronic and/or paper reports automatically upon uploading the results review decision file 36 into LSA such as by immediate presentation of the report on a screen interface to the LSA user during import or by sending the report to the LSA user by e-mail or other notification. Alternately, the report tool 50 can be used upon demand by the LSA user to generate reports. It will further be appreciated that upon export of the decision tool 30 to a remote reviewer, that certain basic information such as the reviewer, the date sent, the date due and other such information are stored in the LSA 100. Thus, the report tool 50 can also advantageously be used by the LSA user to easily track the status of outstanding review requests.

The resolution tool 60 enables the LSA user to resolve conflicts between prior decisions stored in the repository 108 and imported decisions received from the remote reviewer. The resolution tool 60 may also enable the LSA user to resolve discrepancies between the requested decisions and the received review decisions. The resolution tool 60 may automatically be presented during the importation of the review results decision file 36 into LSA or may be used upon demand by the LSA user to resolve saved discrepancies and conflicts stored in LSA during the importation of the results review decisions file 36. The resolution tool 60 electronically presents the discrepancies and conflicts for the documents 101 to the LSA user, such as by an interface screen, whereby the LSA user can electronically make decisions and resolve the outstanding issues in LSA 100 to complete the integration of the review decisions into the repository 108 by accepting, rejecting, or holding the issue. For example, the resolution tool 60 presents the issue of the review decision being to "protect" the document while the master status or prior decision for the document is "not protected". The LSA user could reject the reviewer's decision and close that issue. As another example, the resolution tool 60 presents the issue of the review decision being to "produce" while the prior decision for a particular production is "not produce". The LSA user could accept the new review decision and close the issue such that the decision becomes integrated into the central repository 108 and remains historically associated with the document 101. As yet another example, the resolution tool 60 presents the review decision as being "proposed privilege" while the prior decision associated with the document 101 is "not privileged" or silent on that issue. In this case, the document 101 would be placed on hold for further consideration of a final decision regarding privilege by either the same or a different LSA user. For other conflicts and discrepancies that the importing LSA user cannot resolve, the LSA user could hold or postpone the resolution for another LSA user or remote reviewer having authority to make the decision—such as by setting up an internal review file in LSA for another user or by foldering or holding the documents 101 for another remote review. The LSA user could also send a copy of the discrepancies report (missing or incomplete decisions) generated using the report tool 50 out to the remote reviewer to complete using the reviewer's decision tool 30 already earlier received by the reviewer or by creating a new decision tool 30 that requests decisions only on the discrepancies.

It will be appreciated that the remote review tool 10 enables an LSA user to electronically manage the remote review of documents 101 for legal purposes. The LSA user can electronically identify, restrict, transmit, and track the documents sent to a remote reviewer and designate the requested decisions. It also enables the LSA user to readily electronically integrate the review decisions back into a centralized repository 108 of the documents 101. Furthermore, the LSA user can exactly match the decisions back to the correct documents 101 and document records 103 using their electronic document identification so that decisions are not accidentally associated with an incorrect document or document version. The remote review tool 10 enables the LSA user to readily identify and reconcile any conflicting review decisions against prior decisions made on the documents either in the master instance or the production instances. The LSA user is also able to electronically identify any missing or otherwise deficient or incomplete decisions by the remote reviewers. This is all accomplished while maintaining the integrity of the electronically stored documents 108 in the centralized repository 108 as well as easily recording and storing the historical review decisions associated with the documents 101.

It will be appreciated that although certain features and functions of the overall remote review tool 10 are shown as residing in certain specific tools 20, 30, 40, 50, 60, the tools 20, 30, 40, 50, 60 can reside in separate computer files and instructions on separate computer hardware or can reside in a single computer file on a single set of hardware. For example, it will be appreciated that the decision tool 30 could reside within LSA 100, but that the remote reviewer would be a person having access to LSA, but not with access to the document repository 108 as would be required to review the documents 101 and enter decisions related thereto. It will further be appreciated that the import, export, reporting and resolution tools 20, 40, 50, 60 could all reside in a single computer file or set of instructions within LSA 100. It will be appreciated that a single LSA user may have access to all of the tools 20, 30, 40, 50, 60 comprising the remote review tool 10 or that various users may only have access to various pieces of the remote review tool 10. For example, an LSA user could be responsible for identifying the documents 101 within LSA 100 requiring remote review, but that another LSA user would actually use the import, export, reporting and resolution tools 20, 40, 50, 60. It will further be appreciated that some LSA users could use the export tool 20 while other LSA users can use the import tool 30. It will also be appreciated that the report and/or resolution tools 50, 60 could be restricted to certain LSA users having a higher level of access than those using the export and import tools 20, 40. Many combinations of LSA user access are possible.

In FIG. 1, a block diagram of an exemplary system for electronically managing document review using the remote review tool 10 is generally shown. The LSA system, generally indicated as 100, includes one or more LSA user systems 102 through which LSA users at one or more geographic locations may contact the host system 104. The host system 104 executes computer/software instructions for the remote review of documents 101 for legal purposes, as previously described. For example, the export tool 20, the import tool 40, the report tool 50, and the resolution tool 60 reside on the host system 104, while the decision tool 30 resides remotely. The user systems 102 are coupled to the host system 104 via a network 106. Each user system 102 may be implemented using a general-purpose computer executing a computer program for carrying out the processes described herein. The user systems 102 may be personal computers (e.g., a lap top, and a personal digital assistant) or host attached terminals. If the user systems 102 are personal computers, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g., Internet), a virtual private network (VPN), and an intranet. The network 106 may be implemented using a wireless network or any kind of physical network implementation known in the art. A user system 102 may be coupled to the host system 104 through multiple networks (e.g., intranet and Internet) so that not all user systems 102 are coupled to the host system 104 through the same network. One or more of the user systems 102 and the host system 104 may be connected to the network 106 in a wireless fashion. In one embodiment, the network is an intranet and one or more user systems 102 execute a user interface application (e.g., a web browser) to contact the host system 104 through the network 106, while another user system 102 is directly connected to the host system 104. In another exemplary embodiment, the user system 102 is connected directly (i.e., not through the network 106) to the host system 104 and the host system 104 is connected directly to or contains the central repository 108.

The central data repository 108 may be implemented using a variety of devices for storing electronic information. It is understood that the repository 108 may be implemented using memory contained in the host system 104 or user system 102, or that the repository 108 may be implemented by a separate physical device. The repository 108 includes the documents 101 and is logically addressable as a consolidated data source across a distributed environment that includes a network 106. Information electronically stored in the repository 108, such as the documents 101 and document records 103, may be retrieved and manipulated via the host system 104 or the user system 102. In an exemplary embodiment of the present invention, the host system 104 operates as a database server and coordinates access to application data including data stored in the repository 108.

The repository 108 preferably contains the privileged schema and a non-privileged schema. Databases within these schemas contain documents 101 wherein some or all of the documents 101 are grouped into folders. In addition, it will be appreciated that there may be separate databases for different practice areas (e.g., labor, environmental, and intellectual property) and/or separate databases for different types of legal matters. The documents 101 in the databases are typically scanned documents that are stored as images. Having a privileged schema and a non-privileged schema allows privileged content to be stored separately from non-privileged content, as previously described. Each schema contains its own database entities (e.g., fields, tables, views, and triggers), entity relationships, data, access and security restrictions. Access to the privileged and non-privileged schemas is based on the security levels associated with individual LSA users. The repository 108 also includes production folder tables and other kinds of data such as compact disk (CD) export date and user-id. In an exemplary embodiment, the host system 104 operates as a database server and coordinates access to application data including data stored on the repository 108.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access. For instance, an LSA administrator may have access to the entire system and have authority to modify portions of the system. A firewall may be implemented using conventional hardware and/or software, as is known in the art.

The host system 104 may also operate as an application server. The host system 104 executes one or more computer programs for electronically managing the remote review of documents 101 using the remote review tools 10 supported therein. In addition, the host system 104 houses and manages other computer programs associated with LSA 100. Processing may be shared by the user system 102 and the host system 104 by providing an application (e.g., java applet) to the user system 102. Alternatively, the user system 102 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

FIG. 2 also includes the portable storage device 110 that contains data, information and computer instructions that have been written to the portable storage device by the export tool 20 within the remote review tool 10. The portable storage device 110 (e.g., a compact disk, a universal serial bus device, a floppy disk, etc.) contains the decision tool 30 including electronic copies of the documents 101 from the repository 108 to be reviewed by the remote reviewer, as well as the computer instructions to execute the review on a remote user system 112 used by the remote reviewer. The remote system 112 may have the same characteristics described above in reference to the user system 102 or the host system 104. In accordance with aspects of this invention, the remote system 112 does not have access to the host system 104 or to documents 101 in the repository 108. As part of the decision tool 30 contained on the portable storage device 110, software to view images of the documents 101 is included as well as software to create and write to the decision file 34 (e.g., Microsoft Access).

A reviewer at the remote system 112 receives and executes the decision tool 30 on the portable storage device 110. The remote reviewer electronically reviews documents 101 from the portable storage device 110 and makes and records review decisions into the review decisions file 36 as requested from the requested decisions file 34. The review decisions file 36 is sent to the user system 102 or host system 104 for integration into the repository 108 using the import tool 40, as previously described above. The review decisions file 36 is created by the remote user via the decision tool 30 and transmitted to an LSA user at the user system 102 or host system 104 for integration into the databases on the repository 108 using the import tool 40 wherein the decisions 101 can be electronically associated with the reviewed documents 101, as described above. The review decisions may be electronically transmitted to the user system 102 or host system 104 (e.g., via e-mail) or alternatively by a portable storage medium, such as a floppy disk, CD, USB, etc. . . . may be given to an input operator or LSA user for input to the host system 104.

Other configurations, including those previously described herein, may be utilized to support electronically managing the remote review of documents 101 for legal purposes, and the system is not limited to the specific configuration depicted in FIG. 1.

Figure 4:
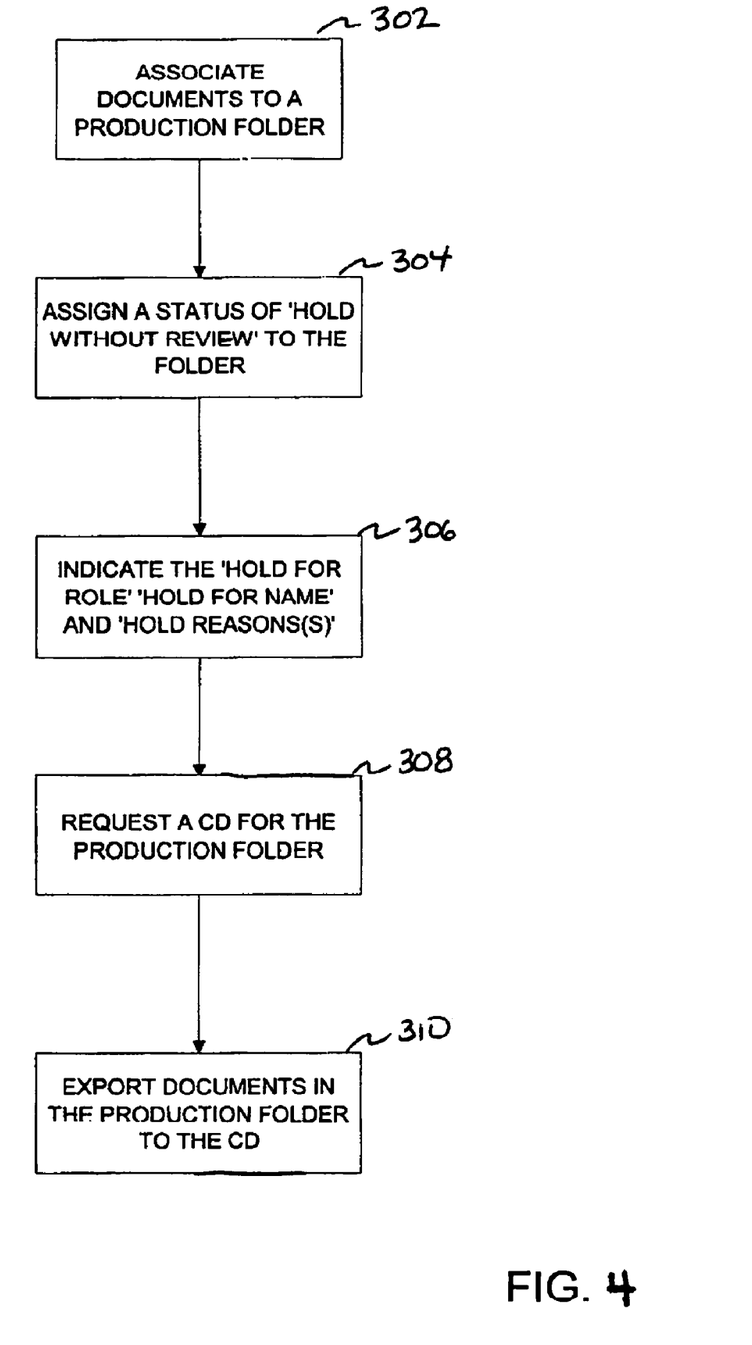
FIG. 4 is a flow diagram of a process for exporting documents for review that may be utilized by exemplary embodiments of the present invention.

FIG. 4 is a flow diagram of a process for identifying and exporting documents 101 for remote review that may be utilized by exemplary embodiments of the present invention. In the example depicted in FIG. 4, at 302, a production folder is populated by the LSA user to include documents 101 for review by a particular remote reviewer. Alternatively, an existing production folder may be utilized. At 302, documents are associated to a production folder. Any document privilege statuses in the LSA are maintained by preventing privileged documents 101 from being added to the production folder. In addition, any documents 101 with privileged portions have the privileged portions redacted before being added to the production folder.

In accordance with an embodiment of the invention, a document folder refers to a collection of documents 101 that are grouped by the LSA user into a specific folder. These documents 101 may relate to a single case or to a specific issue, etc. A production folder refers to a grouping of documents 101 produced or proposed for production and may be similarly related to one another as described above with respect to the documents 101 in a document folder. In addition, the documents 101 in a production folder may be grouped together for export and review by the same reviewer or group of reviewers. The database on the repository 108 includes a production folder table and a document table. The document table includes fields such as: a unique document identifier; a document type (e.g., memo, letter, drawing, photograph, transcript, manual, etc.); a database identifier to identify the database where the document is located; an accession range; an attachment range; case number; discovery fields; product information; privilege information; and issue information. The production folder table includes fields such as: unique production document identifier; production folder identifier; production identifier; and production privilege category.

Referring to FIG. 4, at 304, a status of "hold without review" is assigned to the production folder that was created in 302. A user at user system 102 initiates the assignment. In the present embodiment, there are four production decisions that may be assigned to a production folder: individual review (no decision); hold without review; do not produce without review; and produce without review. By designating individual review, the decision of whether to produce or not is postponed. When a user designates "hold without review", a decision to hold the documents 101 is assigned with a description of the hold reason and the person for whom the documents 101 are held. The "produce without review" option assigns a decision to produce all of the documents 101 in the production folder. "Do not produce without review" causes a decision to be assigned that results in all of the documents 101 within the folder being held without production. Subsequent users of the production folder are told of the hold without review status. However subsequent LSA users with the proper authority are not prevented from changing the status.

At 306, the hold for role (e.g., electrical engineer, mechanical engineer, outside attorney), hold for name and hold reason (s) are entered for the production folder by the user at the user system 102. Hold reason(s) may include items such as further review required, illegible, missing pages, etc. Hold for name is the name of the remote reviewer and hold for role refers to the skills that a reviewer should possess. At 308, a request is made by the user, via the user system 102, to use the export tool 20 to create a portable storage device 110 with the copies of the documents 101 (e.g., heading information and images) and the decision tool 30 associated with the production folder. At 310, the documents 101 in the production folder are loaded onto the portable storage device 110. In an exemplary embodiment of the present invention, the documents 101 on the portable storage device 110 are read only and protected from being copied. As described previously, the portable storage device 110 may be any portable storage medium having capacity to hold the decision tool 30 including the production folder documents 101 and the computer instructions and software for executing the remote review. In addition, the decision tool 30 may be transmitted via a network. Also, 302 through 308 may be performed more than once to create a portable storage device 110 with more than one production folder for review.

Figure 3:
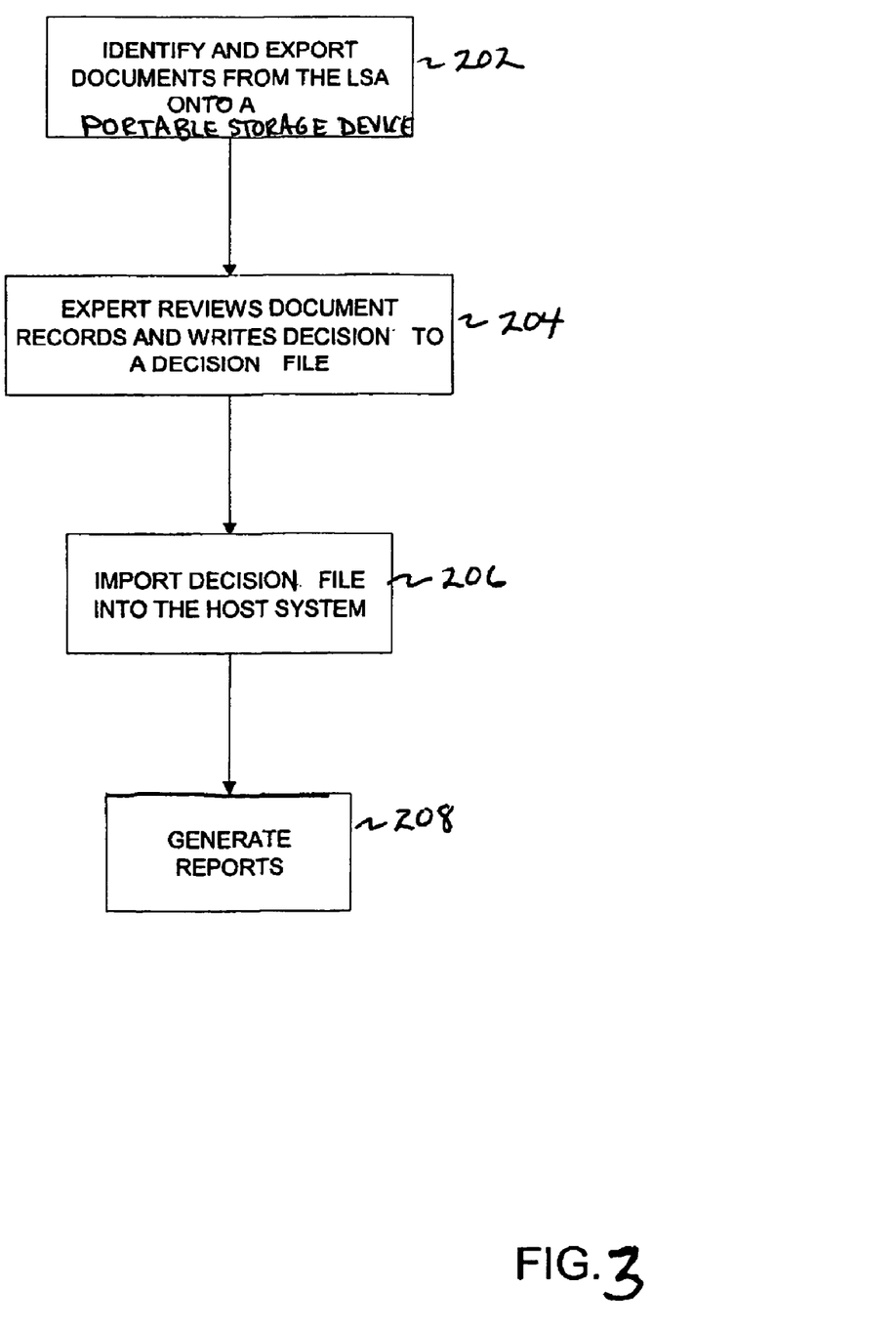
FIG. 3 is a flow diagram of a process for document review that may be utilized by exemplary embodiments of the present invention.

FIG. 3 is a flow diagram of a process for remote review of documents 101 that may be utilized by exemplary embodiments of the present invention. At 202, the documents 101 for remote review are identified in the LSA 100 and exported using the export tool 10 onto a portable storage device 110.

At 204, a remote reviewer (e.g., an outside expert) on the remote user system 112 reviews the documents 101 on the portable storage device 110 and enters recommended decisions in a decision file 36 for one or more of the documents 101 in the production file. This processing is performed at the remote system 112 using the decision tool 30 provided on the portable storage device 110.

Figure 5:
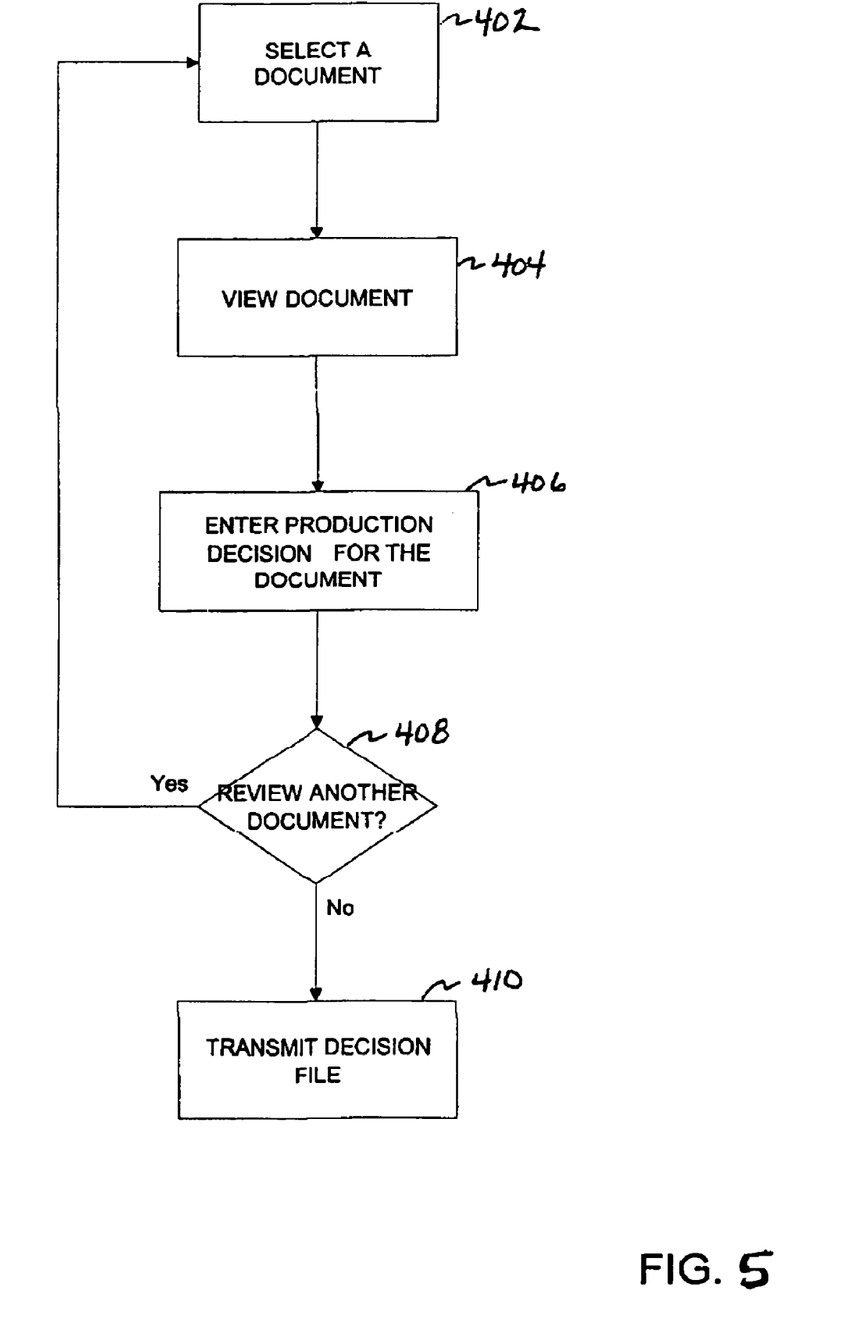
FIG. 5 is a flow diagram of a process for remotely reviewing documents utilized by exemplary embodiments of the present invention.

FIG. 5 is a flow diagram of an exemplary process for remote reviewing of documents for legal purposes using the decision tool 30. At 402, the remote reviewer at the remote system 112 is prompted to select a document 101 from one of the production folders located on the portable storage device 110. At 404, the reviewer views the selected document. Any image viewer that allows the reviewer to view the document may be utilized by the decision tool 30 or alternatively, the decision tool 30 may include specialized software tailored to a particular implementation.

At 406, the remote reviewer enters a review decision for the current document 101 being viewed. The decision tool 30 stores the decision for the document 101 into a review decision file 36. As one example, the remote reviewer may recommend that the document 101 be produced or not produced. If the reviewer recommends that the document 101 not be produced, then the reviewer will be prompted (e.g., via a list box of valid reasons) by the decision tool 30 to provide reasons for not producing the document 101, such as from an electronic pick-list. Examples of reasons for not producing a document 101 include attorney client privileged, attorney client work product, not responsive, outside of scope, outside of complaint allegation. Other feedback about the document 101 may be generated by the reviewer on the remote system 112 and stored in the decision file 36. For example, the reviewer may propose whether the document 101 should be privileged or non-privileged. In addition, the reviewer may propose issue codes to be associated with the document 101. The issue codes could be selected from a list box of valid issue codes. Exemplary embodiments of the present invention may be utilized to provide any type of document categorization for entry into the LSA databases depending on implementation requirements. Different categorizations may be available to different reviewers depending on the authorizations given to them by the creator of the portable storage device 110 and/or on user profiles stored in the host system 104.

At 408 in FIG. 5, the reviewer is prompted by the decision tool 30 to select another document 101 for review or to transmit the decision file 36 to the LSA 100. If the reviewer indicates that another document 101 should be reviewed, then the processing starting at 402 is initiated. If the reviewer indicates that the review is completed, then 410 is performed to transmit the decision file 36 (e.g., via a network, via an e-mail message, via a floppy disk, etc. . . . ) to the LSA 100 system. In an alternate embodiment, the reviewer may also indicate that the review is not complete but that the reviewer would like to exit and return at a later time to continue the review of the documents 101.

Returning to FIG. 3, at 206 the review decisions file 36 is imported into the LSA on the host system 104, such as by using the import tool 40. The recommendations contained in the review decisions file 36 are then correlated to the documents 101 in the LSA 100. The recommendations are added to document records 103 in the database tables that correspond to the documents 101 either in their production or master instances. At 208, reports are generated to report any discrepancies and conflicts. These reports may be automatically generated to alert LSA users of the status or be generated upon demand by the LSA user. Additional reports such as a report listing all of the decisions made by a particular remote reviewer or on a particular date via the remote review tool 10 may also be generated.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for electronically managing remote review of documents for legal purposes, comprising:
   a repository of electronically stored documents;
   a host system comprising:
      an export tool configured to export one or more of the documents for remote review by a reviewer lacking access to the repository; and
      an import tool configured to import designations of the reviewer back into the repository thereby enabling electronic integration of remotely made decisions into the repository; and
   a portable storage device including instructions for executing an electronic decision tool for remote use by the reviewer, the decision tool configured to enable the reviewer to electronically designate discovery categorizations or discovery treatments of the documents, the designated discovery categorizations or discovery treatments assisting a disclosing party receiving a discovery request for document production from a requesting party in identifying documents to be produced to the requesting party in response to the discovery request for document production, such that privileged document content is protected from inadvertent production and waiver of at least one of attorney client privilege and attorney work product doctrine;
   the electronic decision tool electronically recording designated discovery categories or discovery treatments and creating an electronic file of the designated discovery categories or discovery treatments, the electronic file of the designated discovery categories or discovery treatments being a stand-alone file independent of the documents and electronic copies of the documents.

2. The system of claim 1 wherein the electronic decision tool further includes electronic copies of the documents thereby enabling the reviewer to electronically review the documents with the decision tool without having access to the documents in the repository.

3. The system of claim 1 wherein the electronic decision tool further includes a list of discovery categorizations or discovery treatments.

4. The system of claim 3 wherein the electronic decision tool further includes a selection tool configured to electronically record designated discovery categories or discovery treatments from the list.

5. The system of claim 1 wherein the import tool is further configured to identify discrepancies between prior designated discovery categories or discovery treatments and present designated discovery categories or discovery treatments.

6. The system of claim 5 wherein the repository further includes the prior designated discovery categories or discovery treatments.

7. The system of claim 1 wherein the system includes a report tool configured to enable a system user to run one or more reports related to the designated discovery categories or discovery treatments the documents.

8. The system of claim 1 wherein the discovery categorizations includes at least one of privileged, partially privileged, proposed for privileged, non-privileged, and protected.

9. The system of claim 8 wherein protected includes at least one of confidential or proprietary.

10. The system of claim 1 wherein discovery treatments includes at least one of produce and do not produce.

11. The system of claim 1 wherein the reviewer is a human.

12. The system of claim 1 wherein the electronic-file includes fields that match with corresponding fields in document records related to the documents.

13. A method for electronically managing remote review of documents for legal purposes, comprising:
   electronically storing documents in a repository;
   exporting one or more of the documents for remote review by a reviewer lacking access to the repository;
   importing designations of the reviewer back into the repository thereby enabling electronic integration of remotely made decisions into the repository; and
   electronically designating discovery categorizations or discovery treatments of the documents remotely, the designated discovery categorizations or discovery treatments assisting a disclosing party receiving a discovery request for document production from a requesting party in identifying documents to be produced to the requesting party in response to the discovery request for document production, such that privileged document content is protected from inadvertent production and waiver of at least one of attorney client privilege and attorney work product doctrine;
   the electronic decision tool electronically recording designated discovery categories or discovery treatments and creating an electronic file of the designated discovery categories or discovery treatments, the electronic file of the designated discovery categories or discovery treatments being a stand-alone file independent of the documents and electronic copies of the documents.

14. The method of claim 13 further comprising electronically reviewing the documents without having access to the documents in the repository.

15. The method of claim 13 further comprising identifying discrepancies between prior designated discovery categories or discovery treatments and present designated discovery categories or discovery treatments.

16. The method of claim 13 generating one or more reports related to the designated discovery categories or discovery treatments the documents.

17. The method of claim 13 wherein the electronic-file includes fields that match with corresponding fields in document records related to the documents.

18. A storage medium encoded with machine-readable computer program code for performing a method for electronically managing remote review of documents for legal purposes, the method comprising:
   electronically storing documents in a repository;
   exporting one or more of the documents for remote review by a reviewer lacking access to the repository;
   importing designations of the reviewer back into the repository thereby enabling electronic integration of remotely made decisions into the repository; and
   electronically designating discovery categorizations or discovery treatments of the documents remotely, the designated discovery categorizations or discovery treatments assisting a disclosing party receiving a discovery request for document production from a requesting party in identifying documents to be produced to the requesting party in response to the discovery request for document production, such that privileged document content is protected from inadvertent production and waiver of at least one of attorney client privilege and attorney work product doctrine;
   the electronic decision tool electronically recording designated discovery categories or discovery treatments and creating an electronic file of the designated discovery categories or discovery treatments, the electronic file of the designated discovery categories or discovery treatments being a stand-alone file independent of the documents and electronic copies of the documents.

19. The storage medium of claim 18 wherein the method further comprises electronically reviewing the documents without having access to the documents in the repository.

20. The storage medium of claim 18 wherein the method further comprises identifying discrepancies between prior designated discovery categories or discovery treatments and present designated discovery categories or discovery treatments.

21. The storage medium of claim 18 wherein the electronic-file includes fields that match with corresponding fields in document records related to the documents.

22. A system for electronically managing remote review of documents for legal purposes, the system comprising:
   a repository of electronically stored documents;
   a host system including;
      an export tool, the export tool configured to export:
         one or more of the documents for remote review by a reviewer lacking access to the repository; and
      an electronic decision tool for remote use by the reviewer and configured to enable the reviewer to electronically designate discovery categorizations or discovery treatments of the documents, the designated discovery categorizations or discovery treatments assisting a disclosing party receiving a discovery request for document production from a requesting party in identifying documents to be produced to the requesting party in response to a discovery request for document production, such that privileged document content is protected from inadvertent production and waiver of at least one of attorney client privilege and attorney work product doctrine; and
      an import tool configured to import designations of the reviewer back into the repository thereby enabling electronic integration of remotely made decisions into the repository;
   the electronic decision tool electronically recording designated discovery categories or discovery treatments and creating an electronic file of the designated discovery categories or discovery treatments, the electronic file of the designated discovery categories or discovery treatments being a stand-alone file independent of the documents and electronic copies of the documents.

23. The system of claim 22 wherein the electronic-file includes fields that match with corresponding fields in document records related to the documents.

* * * * *